Aug. 10, 1954

C. E. PECK ET AL 2,686,048

ELECTRIC HEATING MEANS

Filed June 7, 1950

INVENTORS
Clarence E. Peck
and Willard Roth.
BY
ATTORNEY

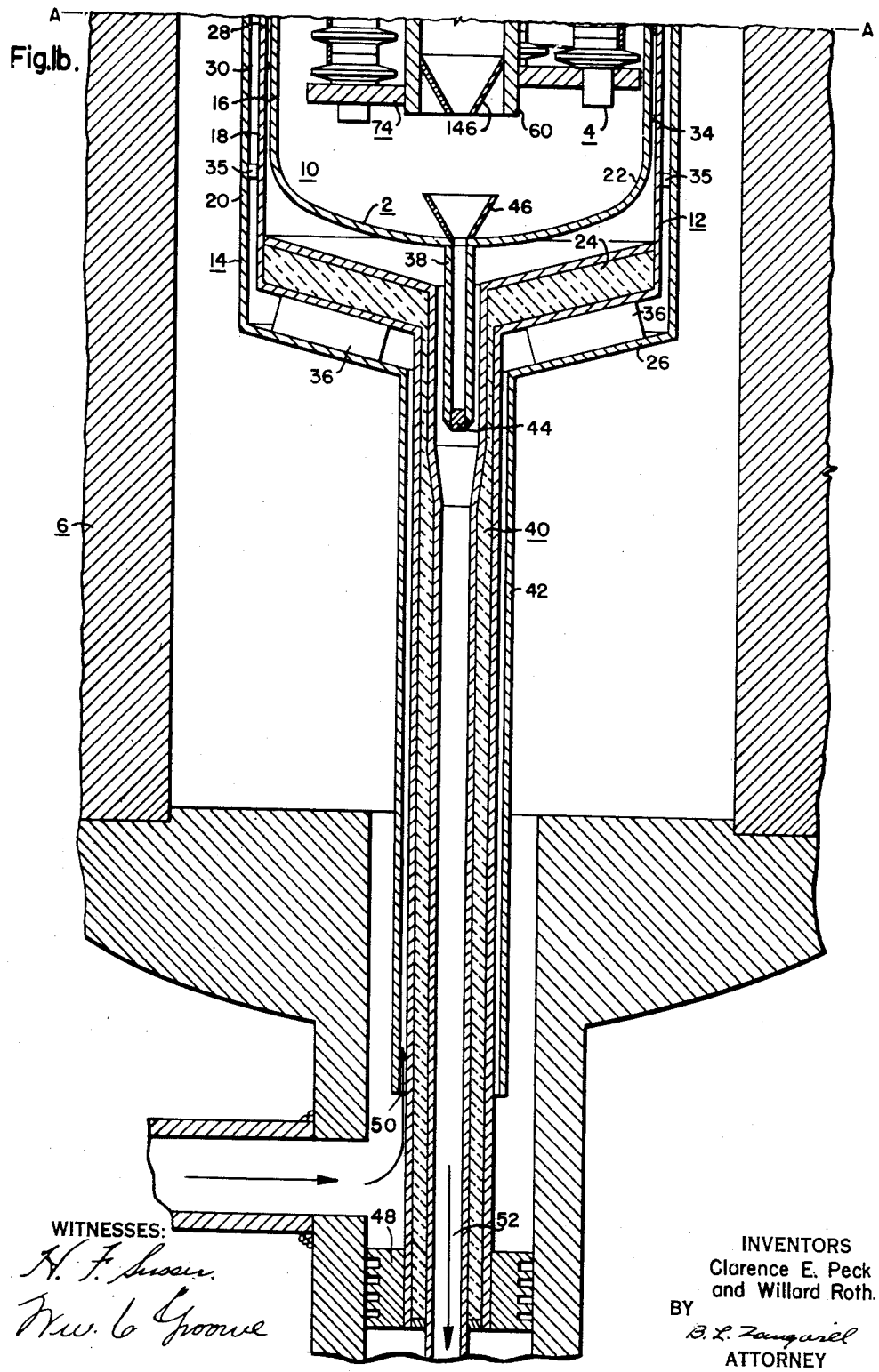

Aug. 10, 1954   C. E. PECK ET AL   2,686,048
ELECTRIC HEATING MEANS
Filed June 7, 1950    4 Sheets-Sheet 3
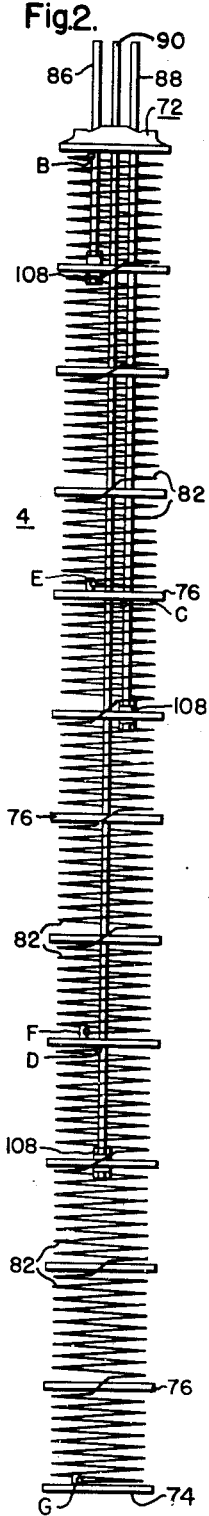
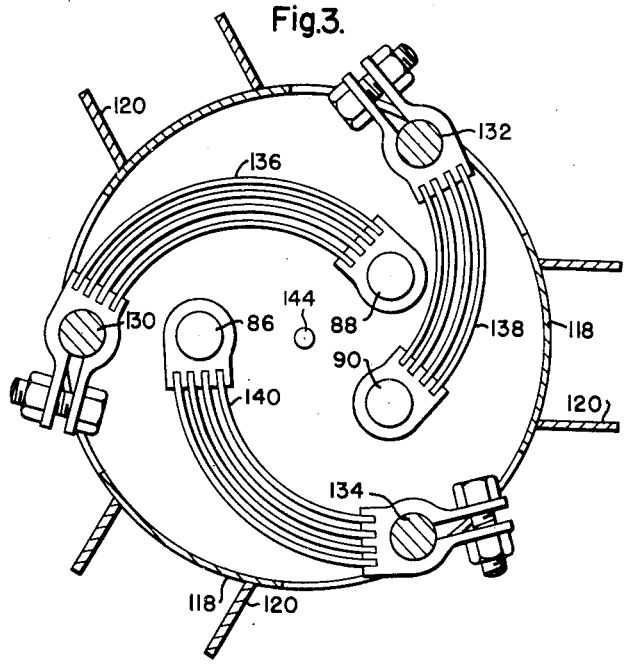
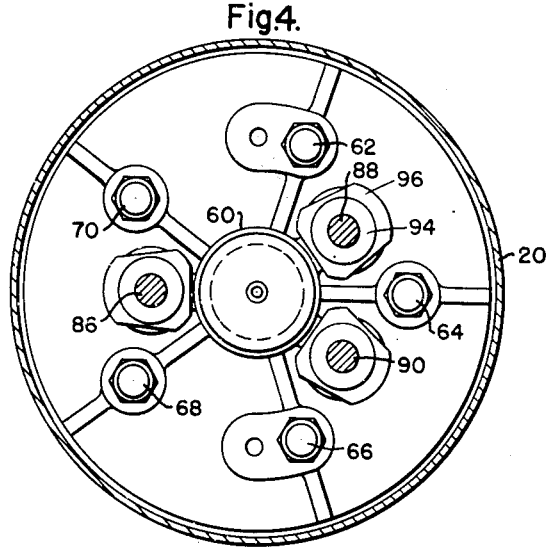
INVENTORS
Clarence E. Peck
and Willard Roth.
BY
B. C. Zangwill
ATTORNEY

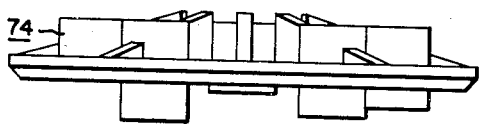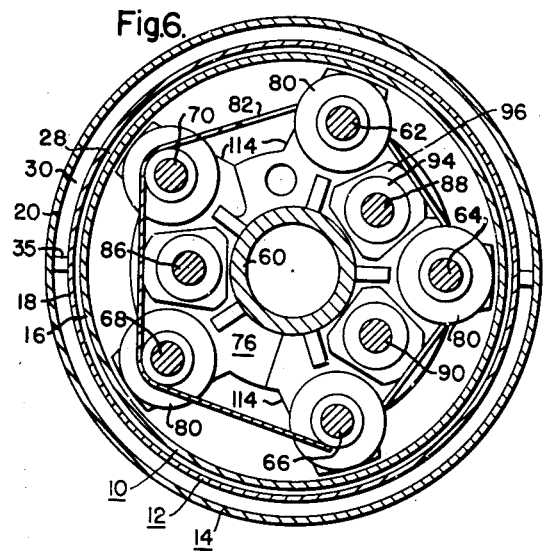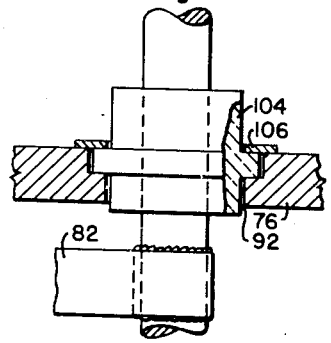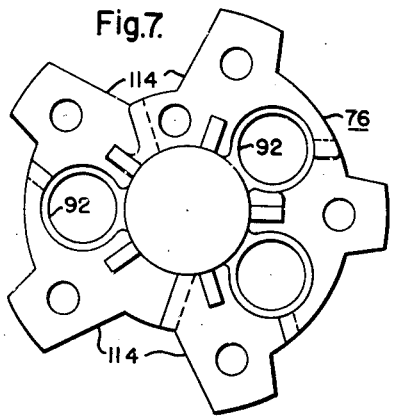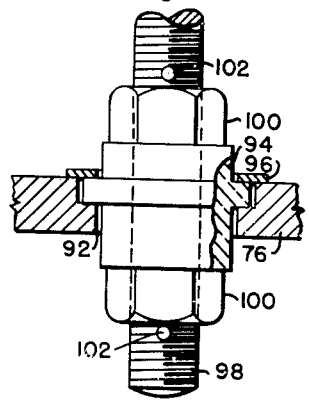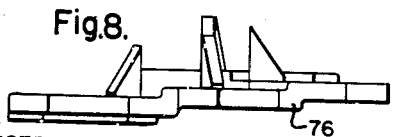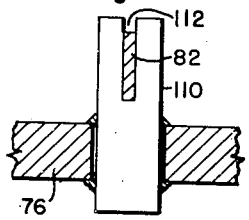

Patented Aug. 10, 1954

2,686,048

UNITED STATES PATENT OFFICE 2,686,048

ELECTRIC HEATING MEANS

Clarence E. Peck, Cambridge Springs, and Willard Roth, Meadville, Pa., assignors to Westinghouse Electric Corporation, East Pittsburgh, Pa., a corporation of Pennsylvania Application June 7, 1950, Serial No. 166,664

6 Claims. (Cl. 263—20)

This invention relates broadly to electrical heating equipment and parts thereof that can be used to add heat to a flowing gas.

An object of this invention is to provide electrical equipment for heating a flowing gas, which is compact and comparatively small for the amount of heat it can impart to the gas.

Features of the invention reside in a shell-structure through which the flowing gas passes and an electric resistor heater inside the shell-structure for heating the flowing gas. The passages for the flowing gas in the shell-structure are comparatively thin but of large area so that the shell-structure is kept cool by the large amount of gas that passes through it. The shell-structure comprises closely spaced concentric tubular members; and the electric resistor heater comprises a coiled, or helically wound, ribbon-resistor carried on a framework inside the innermost of the tubular members. The ribbon-resistor is so wound or coiled that it provides a large heating area in proximity to the innermost of the tubular members. In the preferred embodiment the gas flows into and out of the shell-structure from one end of the equipment, and the electric resistor heater is energized by suitable energizing conductors at the other end of the equipment. Preferably, conductors for energizing the ribbon-resistor extend inside of the resistor-coil and are connected at spaced points thereof which permits the electric resistor heater to be energized with three-phase A. C. power so that a large amount of energy can be supplied thereto.

Additional objects, features and innovations of this invention will be discernible from the following description of a preferred and specific embodiment thereof, to which, however, the gist of this invention is not necessarily limited. The description is to be taken in conjunction with the accompanying drawings, which, except as indicated, are substantially to scale, although the various figures thereof are not to the same scale. In the drawings:

Figs. 1a and 1b, when placed with the former directly above the latter, and their lines A—A fitting, constitute an axial or longitudinal view, partly in section and partly in elevation, with parts broken away to indicate length, of equipment embodying our invention; the view being substantially to scale except for the narrow spaces between the tubular shell members, these spacers being enlarged for clarity of illustration;

Fig. 2 is a diagrammatic view illustrating the arrangement of the resistor of the electric resistor heater in relation to its energizing means and various plates comprising part of the electric resistor heater;

Figs. 3 and 4 are sectional views on the lines III—III and IV—IV, respectively, of Fig. 1a;

Fig. 5 is a side view of a main plate of the electric resistor heater;

Fig. 6 is a sectional view substantially on the line VI—VI of Fig. 1a.

Fig. 7 is a plan view of an intermediate reinforcing plate used in the electric resistor heater;

Fig. 8 is a side view of the plate shown in Fig. 7; and

Figs. 9, 10 and 11 are enlarged detailed views, partly in section and partly in elevation, indicating the manner in which conductors are associated with the various plates of the electric resistor heater for providing the energizing connections to the ribbon-resistor of the heater.

Figure 1A:
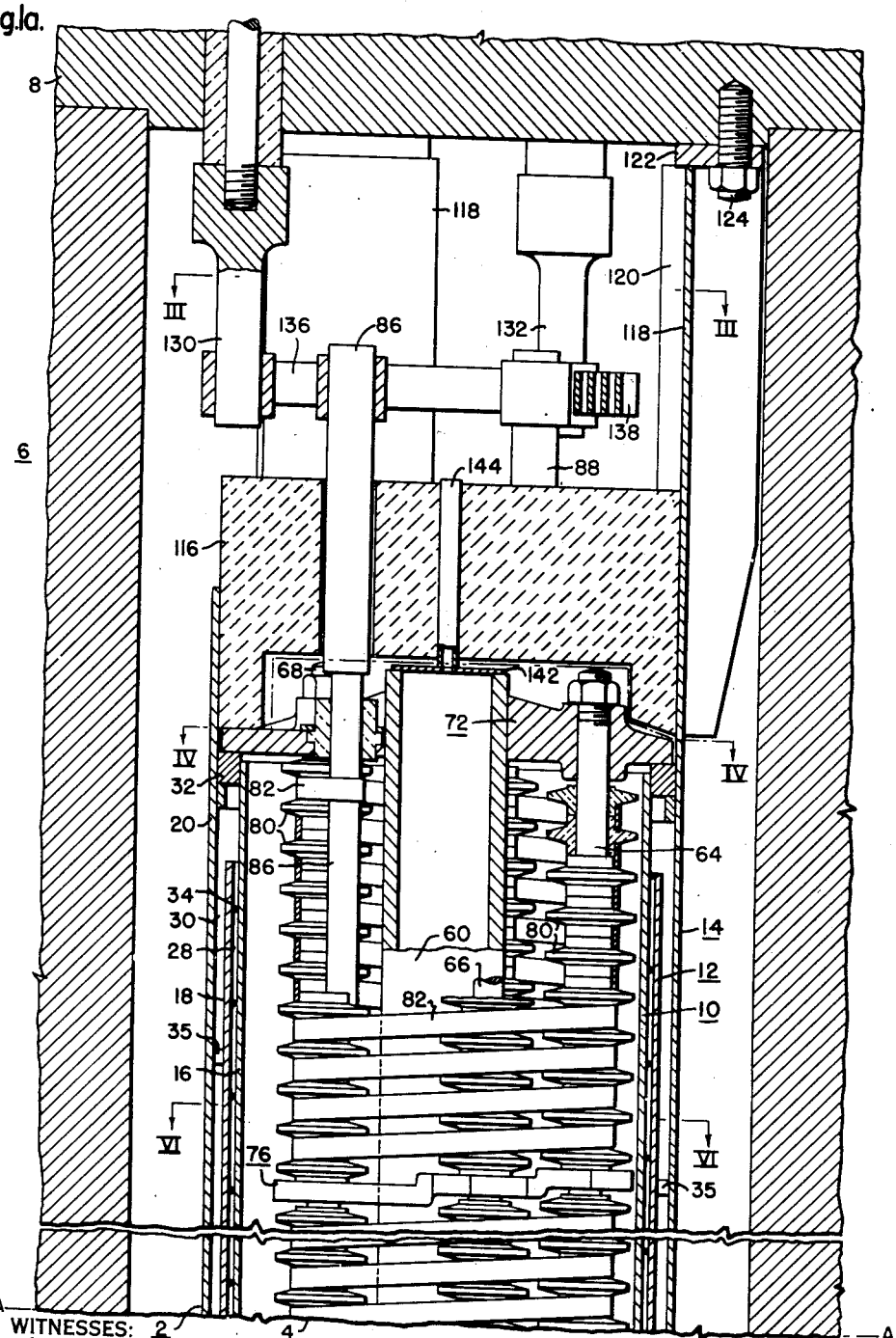

Referring more particularly to Figs. 1a and 1b, a shell-structure, indicated in its entirety by the reference numeral 2, has an electric resistor heater therein, the electric resistor heater being indicated in its entirety by the reference numeral 4. The shell-structure 2 and electric resistor heater 4 which is contained therein are adapted to be placed in a high pressure steel vessel 6 having an outer end wall 8.

The shell-structure 2 comprises a plurality of nested cup-like shell members 10, 12 and 14. The shell members are spaced from each other so that the shell member 10 is innermost, the shell member 14 is outermost and the shell member 12 is between the two. The shell members 10, 12 and 14 comprise, respectively, spaced, concentric, round, metal-tube, side members 16, 18 and 20, and spaced bottom or end members 22, 24 and 26. The spacing between the tubular members 16, 18 and 20 provides an inner gas-flow space 28, and an outer gas-flow space 30. The outer tubular member 20 is longer than the inner tubular member 16, which in turn extends above the intermediate tubular member 18. As shown near the middle of Fig. 1a, an annular metal sealing ring frame 32 is gas-tightly secured completely around protruding end of the inner tubular member 16 and between the inner and outer tubular members 16 and 20, and is spaced from the associated end of the intermediate tubular member 18 so as to provide a communicating gas-passage between the gas-flow spaces 28 and 30.

The preferred embodiment herein described is for heating gases at high pressure, flowing at high velocities. To this end, the inner gas-flow space 28 is radially narrower than the outer gas-flow space 30, so narrow in fact that it is desirable to accurately grind the facing surfaces of the inner and intermediate tubular members 16 and 18 to size. A metal wire bead 34 is helically wrapped around the outer surface of the inner tubular member 16, being secured thereto in any suitable manner. For accurate dimensioning, the outer surface of the bead is subsequently finished by grinding to size so that the intermediate tubular member 18 can slip over the inner tubular member 16 and the bead 34 thereon when the parts are cold, the recommended clearance being not more than about .013 inch for an inner gas-flow space 28 that is .125 inch thick. The bead 34 helps to keep the inner and intermediate tubular members spaced, but it also has the important function of causing the gas to flow through the inner space 28 in a helical path.

For added strength a plurality of small metal spacers 35 can be spaced between outer and intermediate tubular members 20 and 18, and similar narrow spacers 36 between the outer end wall 26 and the intermediate end wall 24. A few only of these spacers are shown in the drawings.

Progressively larger, spaced, concentric pipe means 38, 40 and 42 are respectively gas-tightly secured to the end members 22, 24 and 26, extending downwardly therefrom, as shown in Fig. 1b. The inner and outer tubular members 16 and 20 and the inner and outer pipe means 38 and 42 are formed of single metal walls; whereas the intermediate end member 24 and the intermediate pipe means 40 are formed of two spaced metal walls having heat insulation therebetween. The inner pipe means 38 is comparatively short, and has its free end gas-tightly closed by a metal plug 44. Its other end is provided with a flared metal member 46 so that a temperature-responsive element can be readily set into the pipe means 38 which serves as a well therefor. The intermediate pipe means 40 passes gas-tightly through a sealing ring or piston 48.

The spacing between the intermediate pipe means 40 and the outer pipe means 42 provides a gas inlet 50 to the shell-structure; and the inside of the intermediate pipe means 40 provides an outlet 52.

It is believed that the manner in which gas flows through the shell-structure 2 is obvious. Referring to Figs. 1a and 1b, gas to be heated flows into the inlet 50, passes upwardly between the outer and intermediate pipe means 40 and 42, then passes radially outwardly through the communicating gas-passage between the outer and intermediate end members 24 and 26, then passes up through the outer gas-flow space 30, then passes around the communicating passage bounded by the annular sealing ring frame 32, then passes helically downwardly through the inner gas-flow space 28, then passes radially inwardly through the communicating gas-passage between the inner and intermediate end members 22 and 24 and finally through the pipe means 40 and through the outlet 52. During this flow, the gas is heated by heat energy supplied by the electric resistor heater 4.

The electric resistor heater comprises a metallic skeleton frame that supports a ribbon-resistor helically wound into an elongated coil-form of a plurality of sections. The skeleton frame comprises a central tube or post 60, a plurality of posts 62, 64, 66, 68 and 70 and a plurality of spaced transverse plates secured to the tube and posts. The posts 62, 64, 66, 68 and 70 are arranged around the center tube 60 at the corners of a regular pentagon, as viewed in cross-section.

The plates carried by the posts comprise a main plate 72 at one end of the heater, an end plate 74 at the other end of the heater, and a plurality of intermediate plates each of which is represented by the same reference numeral 76. The intermediate plates 76 are for the purpose of reinforcing the framework and for providing convenient means by which the ribbon-resistor may be electrically connected and energized. As shown in Fig. 2, the electric resistor heater 4 comprises the end plates 72 and 74 and eleven intermediate reinforcing plates 76.

All of the plates 72, 74 and 76 are provided with a central hole that fits the center tube 60 and with a plurality of outer holes that fit the various posts 62, 64, 66, 68 and 70. In assembly of the skeleton frame, a plurality of insulators 80 are set on each of the outer posts 62, 64, 66, 68 and 70, in the spaces between the various plates 72, 74 and 76. These spaces receive sections 82 of a heating ribbon-resistor. The outer posts are adjustably bolted to the main plate 72 and the end plate 74, and the intermediate plates 76 are stepped and provided with suitable bosses so that the insulators 80 are suitably positioned to receive a helical section 82 of the heating ribbon-resistor between each pair of facing plates. As shown in Fig. 6, in cross section the coiled resistor-section is in the nature of a regular pentagon with slightly rounded corners where the ribbon bends around the pairs of abutting insulators 80. This polygonal contour is provided so as to have a large surface area of ribbon-resistor close to the inner tubular member 16 so that heat from the resistor readily flows thereto, and is also conducted thereto by convection. A polygonal cross-section of fewer sides than five would bring parts of the ribbon farther away from the inner tubular member 16; and while more than five sides can be used, the added costs of construction do not appear to be justified.

Energy is fed to the ribbon-resistor through a plurality of connection-conductors. In accordance with our invention, this energy is three-phase so that three conductors 86, 88 and 90 are provided. These connection-conductors 86, 88 and 90 are arranged at the corners of a triangle, as indicated in Fig. 6. The connection-conductors are of different lengths, as indicated in Fig. 2. Each of the connection-conductors insulatedly passes through one or more of the plates 72 and 76 in a manner indicated in Figs. 9 and 10. For uniformity in designs each of the plates is provided with three stepped holes 92. The correspondingly located holes of the plates are aligned with the connection-conductors. Each hole is adapted to receive an insulator. However, such an insulator is provided only in case a connection-conductor passes through the associated hole. With reference to Fig. 2, it can be observed that the connection-conductor 86 passes through plate 72 and is anchored at the next plate 76. The connection-conductor 88 passes through the plate 72, the following four plates 76, and is anchored at the next following plate 76, fifth from the plate 72. The connection-conductor 90 passes through nine plates and is anchored at the tenth plate.

An end of a connection-conductor is anchored at a plate 76 in a manner shown in Fig. 10. An insulator 94 shaped as shown is in the proper hole 92 of the plate. A metal ring 96, secured to the plate 76, helps hold the insulator in place. The insulator 94 has a central hole through which the end of the connection-conductor 86, 88 or 90, as the case may be, passes. This end is threaded and terminates at 98. The threaded end has two nuts 100 on opposite sides of the insulator 94 that hold the connection-conductor lengthwise with respect to the insulator 94. Metal pins 102 can further be provided for locking purposes. These pins pass through the associated connection-conductor on opposite sides of the nuts 96.

At a certain point, each connection-conductor is connected to the end of a ribbon-resistor section 82. To effect such connection the structure shown in Fig. 9 can be used. As shown in Fig. 9, one of the holes 92 of a plate 72 or 76 receives an insulator 104 that is held in place by a metal washer 106 fastened to the plate 76 shown. A connector 86, 88 or 90, as the case may be, passes through this insulator to the next plate 76. Slightly below the insulator 104 an end of the proper section 82 of the heating ribbon-resistor is fastened, preferably by welding, so as to insure a good electrical conduction contact between the connection-conductor and the end of the associated section 82. Preferably, the connection is made at a point near the plate 76 which immediately precedes the plate 76 at which the associated connection-conductor is anchored. This is indicated in Fig. 2 where the equally-spaced points B, C and D represent connection points for the connection-conductors 86, 88 and 90, respectively, and the points 108 represent their anchoring points.

At some points in the electric resistor heater, the ends of certain of the sections 82 are electrically directly connected to the plates 74 and 76. A manner for accomplishing this is shown in Fig. 11 where a short metal rod or post 110 is intimately tied to a plate 74, or 76, as the case may be. This short rod 110 has a slot 112 that intimately receives the end of a section 82 of the ribbon-resistor. In Fig. 2 such connections are represented at equally-spaced points E, F and G.

The electrical connections are more clearly set forth in Fig. 2 which shows the end plates 72 and 74 and eleven intermediate plates 76 spaced to provide a ribbon-resistor of twelve equal sections 82. The connection-conductors 86, 88 and 90 extend axially inside of the general coil formed by the sections 82 of the ribbon-resistor.

The shortest connection-conductor 86 insulatedly passes through the main plate 72 in the manner shown in Fig. 9, and is insulatedly anchored to the next successive intermediate plate 76 in the manner shown in Fig. 10. The connection point B is immediately below the main plate 72, and, hence, current will flow to and from the connection-conductor 86 in a path that may be said to start at the point B, progress through the next four sections 82, to the point E. The ribbon-resistor between the points B and E is bent to cross each intermediate plate 76 at one of the plurality of notches 114 provided therein, so that the crossing portion is space-insulated from the associated plate.

The second shortest connection-conductor 88 is of a length that extends to and is anchored to the plate 76 immediately below the plate which has the point E. Immediately below the plate 76 that has the point E, the connection-conductor 88 is connected to an end of the associated ribbon-resistor thereat at the point C. This ribbon-resistor continues through the next four sections 82 where it terminates at a point F fixed to the plate 76 thereat.

The longest connection-conductor 90 insulatedly passes through a number of the plates and is anchored to the one below that containing the point F. Immediately under the plate containing the point F, the connection-conductor 90 is connected to the end of the associated ribbon-resistor, as indicated at point D. This ribbon-resistor is continuous downward to the point G.

The various metal plates 72, 74 and 76 are electrically interconnected by the various posts 60, 62, 64, 66, 68 and 70 so that in effect the resistor coil, comprising the three equal portions described, is Y-connected having spaced energizing points at B, C and D, and having neutral points at E, F and G at a common potential.

For conveying electricity to the connection-conductors 86, 88 and 90, the equipment may be built as shown at the upper part of Fig. 1a and in Fig. 3. The main plate 72 rests snugly on the ring frame 32; and an insulating cap or wall 116 closes the associated end of the outer tubular member 20 of the shell-structure 2. The connection-conductors pass through oversize holes in the cap 116, extending slightly above the cap. At this end of the shell-structure, the outer tubular member 20 has three axially extending legs 118 which are equally spaced circumferentially. Each of these legs 118 longitudinally receives a pair of radially-directed reinforcing metal bars 120 across which is secured a metal plate 122 for a suitable securing means, represented by bolt 124, so that the heating equipment, comprising the shell-structure 2 and the electric heater resistor 4, can be tightly bolted, or otherwise secured, to the end member 8 of the pressure vessel 6 or other supporting structure.

For conveying three-phase electrical energy from outside the vessel 6 to the connection-conductors 86, 88 and 90, a plurality of terminals 130, 132 and 134 are provided that insulatedly pass through the end member 8 of the vessel.

It is to be noted that the posts 60, 62, 64, 66, 68 and 70, the connection-conductors 86, 88 and 90 and the terminals 130, 132 and 134 are parallel, extending longitudinally parallel to the axis of the tubular members 16, 18 and 20 of the shell-structure 2.

The terminals 130, 132 and 134 are connected to the connection-conductors 86, 88 and 90, respectively through strap connections 136, 138 and 140, respectively. Each of these strap connections comprises a plurality of parallel curved straps curved about an axis parallel to the axis of the electric heater so that the flat faces of the strap are parallel to this axis.

Apparatus in accordance with the foregoing can be used to heat gases at pressures as high as 6,000 lbs. per square inch, and more. Heat transfer from the electric resistor heater 4 is materially aided by convection and radiant dissipation so that a great deal of energy can be fed to the ribbon-resistor.

It is to be noted that the gas-flow path in the shell-structure 2, comprising the outer gas-flow space 30 and the inner gas-flow space 28, is completely separated from the atmosphere inside the electric resistor heater 4 and the vessel 6, the latter two being in open gas-communication through the enlarged holes in the end wall or cap 116 through which the connection-conductors 86, 88 and 90 pass. Consequently, this space inside the vessel 6 and inside the inner tubular member 16 of the shell-structure can be permeated with any desired gas. Hydrogen is recommended because of its high natural convection factor which, at 6,000 lbs., is 24 B. t. u. per square foot per degrees F. per hour. By having this permeating atmosphere at high pressure which is close to that of the gas within the gas-passages of the shell-structure 2, the shell-structure walls can be comparatively thin.

It is also obvious that the different metal parts of the equipment should be chosen to resist the temperatures to be encountered and to be substantially non-reactive with the gases in the equipment. For example, for a particular equipment useful for heating gases including hydrocarbons and sulfur compounds, at pressures of 6,000 lbs. per square inch, it is recommended that the material of the metal parts, exclusive of the primary current conductors and the ribbon-resistor, having a composition of 22 to 26% chromium, 12 to 15% nickel, balance iron, in apparatus with an outer tubular member 20 of an overall length of about 191 inches and an inner diameter of 14⅞ inches; an inner tubular member 16 of an overall length of about 163½ inches from the far end to the point where it meets the curved portion of its bottom member such as 22, and an outer diameter of 13½ inches; and an intermediate tubular member 18 of a length of about 169 inches and inner and outer diameters of 13¾ inches and 14¼ inches, respectively. Copper or nickel is recommended for the main terminals; and an alloy comprising 20% chromium, 80 of nickel, for the connection-conductors and resistor-ribbon which may be 1⅜ inch wide and 0.140 inch thick. In such an equipment, the gas flowing through the gas-passages in the shell structure may have a mass velocity in the order of about 120,000 lbs. per square foot per hour. This gas, having an incoming temperature of 450° C., will be heated to temperatures of about 600° C. without the inner tubular member 16 exceeding 640° C. in temperature, with an electric heater resistor capable of operating at a temperature of approximately 1850° F. or 1010° C., and capable of dissipating from 80 to 90 watts, more or less, of energy per square inch of a ribbon-resistor.

It is to be observed that the central tube 60 of the electric heater resistor 4 is provided with a cover plate 142. This cover plate 142 has a central hole which receives a pipe 144 through which a temperature measuring instrument can be inserted downwardly through the central tube 60 and into the well of the pipe means 38. An additional truncated metal cone 146 can be secured to the bottom end of the central tube 60 for guiding the instrument into the well 38.

While we have described our invention in a preferred embodiment, it is obvious that the teachings and principles thereof, may have wide application.

We claim as our invention:

1. Gas-heating equipment comprising, in combination, three nested tubular members comprising an outer tubular member, and spaced concentric intermediate and inner tubular members, said nested tubular members providing a preheating space between the outer and intermediate tubular members, a heat-treatment space between the intermediate and inner tubular members, and a gas-filled convection-space for a heating-means inside of the inner tubular member, a heating-means disposed inside of said inner tubular member, a means for providing a gas-inlet for the gas to enter near one end of the preheating space between the outer and intermediate tubular members, and an end-means comprising an annular plug between the outer and inner tubular members at the other end of the tubular members for providing a gas-communication from the preheating space to the heat-treatment space between the intermediate and inner tubular members, the inner tubular member being closed at a gas-outlet end, and the intermediate tubular member extending away from said inner tubular member at said gas-outlet end to provide a gas-outlet for discharging the gas from the heat-treatment space without flowing through the space in which the heating-means is disposed, said gas-outlet means and said gas-inlet means being disposed near the same end of the three nested tubular members.

2. The invention as defined in claim 1, characterized by a means disposed in at least one of said spaces between concentric tubular members for providing a tortuous gas-passage within said space.

3. The invention as defined in claim 1, characterized by said heat-treatment space being very narrow radially, and said preheating space having a greater radial width.

4. The invention as defined in claim 1, characterized by said heat-treatment space being very narrow radially, and a means disposed in said heat-treatment space for providing a tortuous gas-passage within said space.

5. Equipment as defined in claim 1, adapted for heating a gas under high pressure, characterized by including an outer pressure-vessel surrounding said nested tubular members.

6. Equipment as defined in claim 1, characterized by the three nested tubular members being all of metal.

References Cited in the file of this patent

UNITED STATES PATENTS

| Number | Name | Date |
| --- | --- | --- |
| 857,381 | Brougham | June 18, 1902 |
| 1,286,135 | Somermeier | Nov. 26, 1918 |
| 1,408,987 | Casale | Mar. 7, 1922 |
| 1,480,645 | Waller | Jan. 15, 1924 |
| 1,572,381 | Brace | Feb. 16, 1926 |
| 1,649,925 | Ruckstahl | Nov. 22, 1927 |
| 1,671,461 | Bagley | May 29, 1928 |
| 1,986,348 | Lacy et al. | Jan. 1, 1935 |
| 1,988,845 | Jewett | Jan. 22, 1935 |
| 2,235,401 | Gier | Mar. 18, 1941 |
| 2,264,693 | Gier, Jr. | Dec. 2, 1941 |
| 2,463,115 | Legatski | Mar. 1, 1949 |